United States Patent
Yamaguchi et al.

(10) Patent No.: US 8,121,488 B2
(45) Date of Patent: Feb. 21, 2012

(54) INFRARED COMMUNICATION APPARATUS AND INFRARED COMMUNICATION METHOD

(75) Inventors: Kumiko Yamaguchi, Yokosuka (JP); Masaharu Nakatsuchi, Yokohama (JP); Kenji Mameda, Kashihara (JP); Hitoshi Naoe, Nara (JP); Masaki Nishida, Higashi-Hiroshima (JP); Tsukasa Kaminokado, Tenri (JP)

(73) Assignees: NTT DoCoMo, Inc., Tokyo (JP); Sharp Kabushiki Kaisha, Osaki-shi (JP)

( * ) Notice: Subject to any disclaimer, the term of this patent is extended or adjusted under 35 U.S.C. 154(b) by 870 days.

(21) Appl. No.: 12/064,341

(22) PCT Filed: Aug. 24, 2006

(86) PCT No.: PCT/JP2006/316590
§ 371 (c)(1),
(2), (4) Date: Aug. 4, 2008

(87) PCT Pub. No.: WO2007/023888
PCT Pub. Date: Mar. 1, 2007

(65) Prior Publication Data
US 2009/0136232 A1    May 28, 2009

(30) Foreign Application Priority Data
Aug. 25, 2005 (JP) ............... P2005-244796

(51) Int. Cl.
*H04B 10/00* (2006.01)
(52) U.S. Cl. ........................ 398/128; 398/130
(58) Field of Classification Search .................. 398/128, 398/103, 96, 130
See application file for complete search history.

(56) References Cited

U.S. PATENT DOCUMENTS

| | | | | |
|---|---|---|---|---|
| 5,585,952 A | * | 12/1996 | Imai et al. | 398/103 |
| 7,386,238 B2 | * | 6/2008 | Ternullo et al. | 398/118 |

(Continued)

FOREIGN PATENT DOCUMENTS

EP      0 695 069 A2    1/1996

(Continued)

OTHER PUBLICATIONS

Williams, Timothy et al., "Serial Infrared Link Access Protocol (IRLAP)", Infrared Data Association, pp. 1 to 116, 1996.

(Continued)

*Primary Examiner* — Kenneth N Vanderpuye
*Assistant Examiner* — Abbas H Alagheband
(74) *Attorney, Agent, or Firm* — Oblon, Spivak, McClelland, Maier & Neustadt, L.L.P.

(57) ABSTRACT

An infrared communication apparatus and method enabling data communication with a receiving device, regardless of a protocol with which the receiving device is compatible. A transmitting unit transmits a first packet to inquire whether a receiving device is compatible with a first protocol and transmits a second packet to inquire whether the receiving device is compatible with a second protocol, to the receiving device at least once, and transmits a plurality of third packets to inquire whether the receiving device is compatible with a third protocol, to the receiving device. A receiving unit receives a response packet indicating a protocol with which the receiving device is compatible, from the receiving device having received the first packet, the second packet, and the plurality of third packets. A data transmitting unit transmits data to the receiving device, based on the protocol indicated by the response packet received by the receiving unit.

4 Claims, 5 Drawing Sheets

U.S. PATENT DOCUMENTS

2008/0279562 A1 * 11/2008 Naoe et al. .................... 398/140

FOREIGN PATENT DOCUMENTS

| EP | 0 886 410 A2 | 12/1998 |
| EP | 1 848 178 A1 | 10/2007 |
| JP | 8 37548 | 2/1996 |
| JP | 8 195785 | 7/1996 |
| JP | 9 331368 | 12/1997 |
| JP | 11 41317 | 2/1999 |
| JP | 11 45218 | 2/1999 |
| JP | 2000 32000 | 1/2000 |
| JP | 2000 184467 | 6/2000 |
| JP | 2003 198568 | 7/2003 |

OTHER PUBLICATIONS

Office Action issued Jan. 25, 2011, in Japanese Patent Application No. P2005-244796 (with English translation).

Office Action issued Nov. 9, 2010, in Japan Patent Application No. P2005-244796.

* cited by examiner

INFRARED COMMUNICATION APPARATUS AND INFRARED COMMUNICATION METHOD

TECHNICAL FIELD

The present invention relates to an infrared communication apparatus and infrared communication method for performing infrared communication with a receiving device for receiving data.

BACKGROUND ART

The IrDA (Infrared Data Association) protocol disclosed in Non-patent Document 1 is known as a protocol defined by the standard of short-range exchange of data over infrared light. The IrDA protocol involves an advance preparation for initiating transmission/reception of data, using a plurality of packets.

On the other hand, the IrSimple protocol was developed as an improvement of the IrDA protocol, in order to increase the efficiency of communication and the transfer rate. In the data communication using the IrSimple protocol, as shown in FIG. 5, a transmitting device to transmit data first transmits an SNRM (Set Normal Response Mode)—Command-Frame (IrSimple) packet (hereinafter referred to as an SNRM packet) 30, to a receiving device to receive the data. When the receiving device is compatible with the IrSimple protocol, the receiving device receives the SNRM packet 30 and thereafter sends a response to this SNRM packet 30 to the transmitting device. With this, transmission/reception of data based on the IrSimple protocol is initiated between the transmitting device and the receiving device. For taking account of a case where the receiving device is not ready to receive the data yet upon the transmission of the SNRM packet 30 to the receiving device, another SNRM packet 32 is again transmitted from the transmitting device to the receiving device after an after-described XID one-slot packet 40 is transmitted from the transmitting device to the receiving device.

After the foregoing SNRM packet 30, the transmitting device transmits to the receiving device, a Discovery-XID-Cmd packet (hereinafter referred to as an XID one-slot packet) 40 using one slot (i.e., being one slot) with the least significant two bits of 00 in Discovery Flags. When the receiving device is compatible with this XID one-slot packet 40 (i.e., when it is compatible with one slot), the receiving device sends a response to this XID one-slot packet 40 to the transmitting device. With this, transmission/reception of data based on the IrDA protocol is initiated between the transmitting device and the receiving device.

Non-patent Document 1: Infrared Data Association, "Serial Infrared Link Access Protocol (IrLAP)," (USA), Jun. 16, 1996, Version 1.1

DISCLOSURE OF THE INVENTION

Problem to be Solved by the Invention

The recent receiving devices produced and used include, for example, those compatible with only a discovery method using a plurality of Discovery-XID-Cmd packets (hereinafter referred to as XID multi-slot packets) with the least significant two bits of 01 in Discovery Flags and with slot numbers of 0-7, e.g., eight XID multi-slot packets (that is, the receiving devices compatible with multi-slots in this case). When a receiving device receives the XID multi-slot packets, it selects one of the XID multi-slot packets at random by a random number or the like and sends a Discovery-XID-Rsp (IrDA) packet corresponding to the selected XID multi-slot packet to the transmitting device. With this, the receiving device can notify the transmitting device of the existence of the receiving device to receive the data based on the IrDA protocol from the transmitting device (transmission/reception of data is the same in both of the one-slot compatible case and the multi-slot compatible case). Then the transmitting device transmits an SNRM-Command-Frame packet (hereinafter referred to as an SNRM confirmation packet) to the receiving device and then the receiving device sends a response to this SNRM confirmation packet to the transmitting device. This completes a connection process (Connect). With this, multi-slot-compatible transmission/reception of data is initiated between the transmitting device and the receiving device.

The receiving device with the multi-slot-compatible function only waits for reception of the XID multi-slot packets. For this reason, when such a receiving device receives only the XID one-slot packet from a one-slot-compatible transmitting device, it goes into a waiting state for reception of another packet and sends no response, and therefore there is a problem that it cannot perform data communication with the transmitting device.

An object of the present invention is therefore to provide an infrared communication apparatus and infrared communication method enabling data communication with a receiving device, irrespective of a protocol with which the receiving device is compatible.

Means for Solving the Problem

An infrared communication apparatus of the present invention is an infrared communication apparatus for performing infrared communication with a receiving device for receiving data, the infrared communication apparatus comprising: transmitting means for performing transmission of a first packet to inquire whether the receiving device is compatible with a first protocol for carrying out a predetermined first communication procedure, and transmission of a second packet to inquire whether the receiving device is compatible with a second protocol for carrying out a predetermined second communication procedure, to the receiving device at least once, and thereafter transmitting a plurality of third packets to inquire whether the receiving device is compatible with a third protocol for carrying out a predetermined third communication procedure, to the receiving device; receiving means for receiving a response packet to indicate a protocol with which the receiving device is compatible, from the receiving device having received the first packet, the second packet, and the plurality of third packets from the transmitting means; and data transmitting means for transmitting the data to the receiving device, based on the protocol indicated by the response packet received by the receiving means.

In the infrared communication apparatus of the present invention, the transmitting means first transmits the first packet and the second packet at least once. After this, the transmitting means transmits the plurality of third packets to the receiving device. Then the receiving means receives the response packet indicating the protocol with which the receiving device is compatible, which was transmitted from the receiving device having received the first packet, the second packet, and the plurality of third packets. The data transmitting means transmits the data to the receiving device, based on the protocol indicated by the response packet received by the receiving means. In this configuration, even if the receiving device is compatible with only the first protocol, e.g., the IrSimple protocol, the first packet is transmitted to this receiving device, and therefore it is feasible to perform the data transmission based on the protocol indicated by the response packet sent from the receiving device in response to the first packet, i.e., based on the IrSimple protocol. Even if the receiving device is compatible with only the second protocol, e.g., the single-slot or one-slot-compatible IrDA protocol, the second packet is transmitted to this receiving device, and it is thus feasible to perform the data transmission based on the protocol indicated by the response packet sent from the receiving device in response to the second packet, i.e., based on the one-slot-compatible IrDA protocol. Furthermore, even if the receiving device is compatible with only the third protocol, e.g., the multi-slot-compatible IrDA protocol, the plurality of third packets are transmitted to this receiving device, and it is thus feasible to perform the data transmission based on the protocol indicated by the response packet sent from the receiving device in response to the third packets, i.e., based on the multi-slot-compatible IrDA protocol. As a result, it is feasible to perform the data communication between the infrared communication apparatus and the receiving device, irrespective of the protocol with which the receiving device is compatible.

The infrared communication apparatus is also preferably configured as follows: the transmitting means again transmits the first packet to the receiving device, after completion of transmission of all the plurality of third packets.

This configuration permits the following operation: even if the receiving device is not ready to receive the first packet transmitted from the transmitting means, another first packet is again transmitted thereto and therefore the receiving device can receive the first packet more definitely.

An infrared transmission method of the present invention is an infrared communication method for performing infrared communication with a receiving device for receiving data, the infrared communication method comprising: a transmitting step of performing transmission of a first packet to inquire whether the receiving device is compatible with a first protocol for carrying out a predetermined first communication procedure, and transmission of a second packet to inquire whether the receiving device is compatible with a second protocol for carrying out a predetermined second communication procedure, to the receiving device at least once, and thereafter transmitting a plurality of third packets to inquire whether the receiving device is compatible with a third protocol for carrying out a predetermined third communication procedure, to the receiving device; a receiving step of receiving a response packet to indicate a protocol with which the receiving device is compatible, from the receiving device having received the first packet, the second packet, and the plurality of third packets in the transmitting step; and a data transmitting step of transmitting the data to the receiving device, based on the protocol indicated by the response packet received in the receiving step.

In the infrared transmission method of the present invention, the first packet and the second packet are first transmitted at least once in the transmitting step. After this, the plurality of third packets are transmitted to the receiving device in the transmitting step. The receiving step is to receive the response packet indicating the protocol with which the receiving device is compatible, which was transmitted from the receiving device receiving the first packet, the second packet, and the plurality of third packets. In the data transmitting step the data is transmitted to the receiving device, based on the protocol indicated by the response packet received in the receiving step. In this method, even if the receiving device is compatible with only the first protocol, e.g., the IrSimple protocol, the first packet is transmitted to this receiving device and it is thus feasible to perform the data transmission based on the protocol indicated by the response packet sent from the receiving device in response to the first packet, i.e., based on the IrSimple protocol. Even if the receiving device is compatible with only the second protocol, e.g., the single-slot or one-slot-compatible IrDA protocol, the second packet is transmitted to this receiving device and it is thus feasible to perform the data transmission based on the protocol indicated by the response packet sent from the receiving device in response to the second packet, i.e., based on the one-slot-compatible IrDA protocol. Furthermore, even if the receiving device is compatible with only the third protocol, e.g., the multi-slot-compatible IrDA protocol, the plurality of third packets are transmitted to this receiving device and it is thus feasible to perform the data transmission based on the protocol indicated by the response packet sent from the receiving device in response to the third packets, i.e., based on the multi-slot-compatible IrDA protocol. As a result, it is feasible to perform the data communication between the infrared communication apparatus and the receiving device, irrespective of the protocol with which the receiving device is compatible.

EFFECT OF THE INVENTION

The present invention enables the data communication with the receiving device, regardless of the protocol with which the receiving device is compatible.

Figure 1:
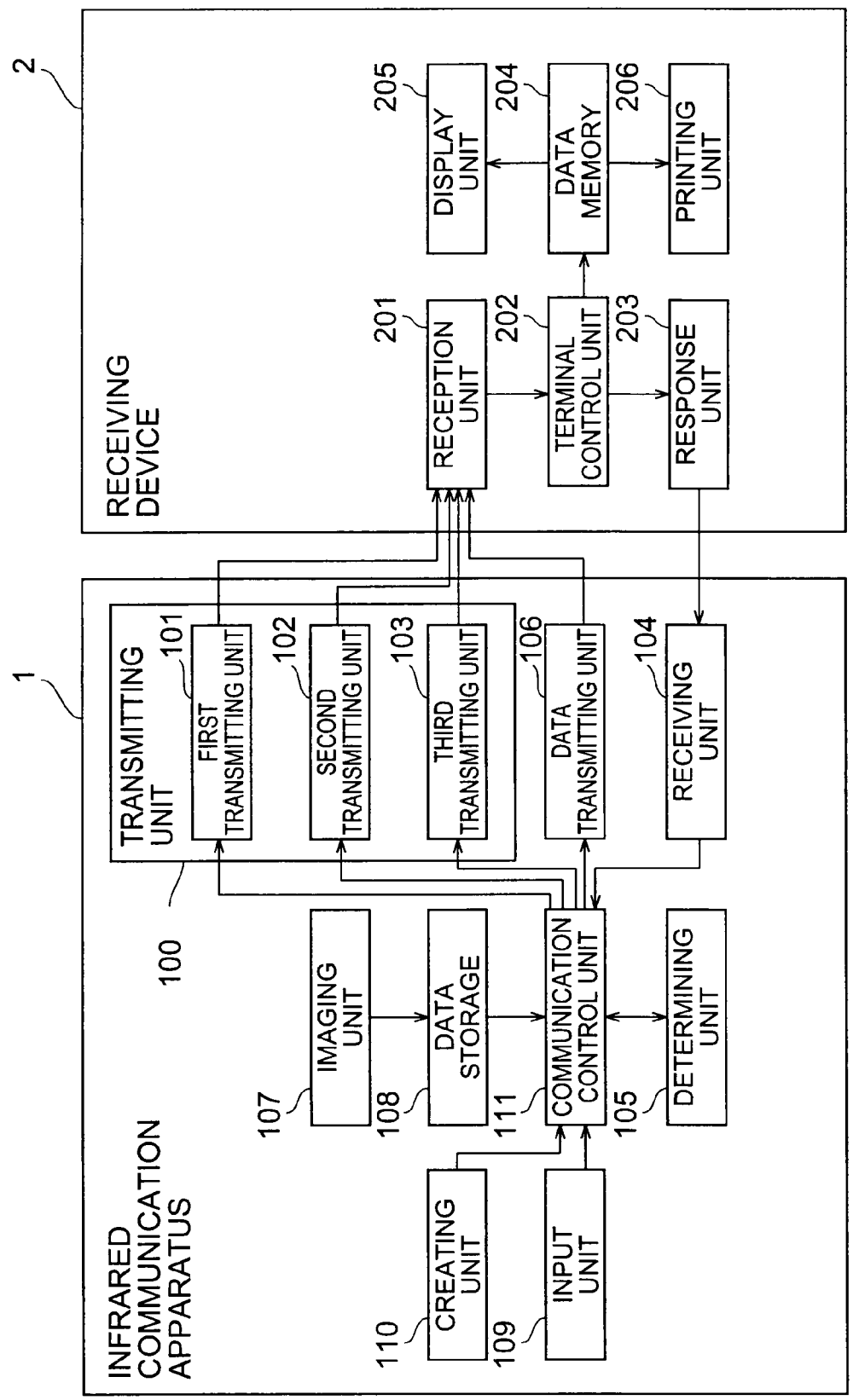
FIG. 1 is a configuration diagram of an infrared communication apparatus and a receiving device in an embodiment of the present invention.

EXPLANATION OF SYMBOLS 1 infrared communication apparatus
2 receiving device
10 discovery command
10A-10C command groups
30, 32, 50, 52, 53, 55, 56, 58 SNRM packets
31, 51, 54, 57 End packets
40, 60, 70 XID one-slot packets
80-87 XID multi-slot packets
100 transmitting unit
101 first transmitting unit
102 second transmitting unit
103 third transmitting unit
104 receiving unit
105 determining unit
106 data transmitting unit
107 imaging unit
108 data storage unit
109 input unit
110 creating unit
111 communication control unit
201 reception unit
202 terminal control unit 203 response unit
204 data memory unit
205 display unit
206 printing unit

BEST MODE FOR CARRYING OUT THE INVENTION

The preferred embodiments of the present invention will be described below with reference to the accompanying drawings. The same elements will be denoted by the same reference symbols throughout the description of the drawings, without redundant description.

An infrared communication apparatus being an embodiment of the present invention will be described with reference to FIG. 1. The infrared communication apparatus 1 is an apparatus for performing short-range communication of data over infrared light, with a receiving device for receiving data (e.g., a personal computer, a television set, a printer, or the like with an infrared receiving unit). An example of the infrared communication apparatus 1 is a cell phone unit with infrared transmitting and receiving units or the like. This infrared communication uses the IrSimple protocol (in which a peak wavelength value of infrared light used is approximately 850 nm) being an improvement of the IrDA protocol. Namely, the IrDA protocol and the IrSimple protocol both are used. FIG. 1 is a configuration diagram for explaining configurations of the infrared communication apparatus 1 and receiving device 2.

The infrared communication apparatus 1 is comprised of the following functional components: transmitting unit (transmitting unit) 100, receiving unit (receiving unit) 104, determining unit 105, data transmitting unit (data transmitting unit) 106, imaging unit 107, data storage unit 108, input unit 109, creating unit 110, and communication control unit 111. The transmitting unit 100 is composed of first transmitting unit 101, second transmitting unit 102, and third transmitting unit 103.

Subsequently, each of the components of the infrared communication apparatus 1 will be described. The first transmitting unit 101 is a part that transmits a first packet to the receiving device 2. The first packet herein is a packet to inquire whether the receiving device 2 is compatible with a first protocol and, for example, the aforementioned SNRM packet (i.e., the SNRM-Command-Frame (IrSimple) packet) corresponds thereto. The first protocol is an infrared communication protocol using a single slot for performing a predetermined first communication procedure and, for example, the aforementioned IrSimple protocol corresponds thereto. A slot refers to a sequence including transmission of a packet containing a command for the infrared communication apparatus 1 to discover a receiving device 2 or a plurality of receiving devices 2, and waiting for reception of a response packet to the transmitted packet for a predetermined period of time (e.g., a duration of 50 milliseconds as described below). The description hereinafter will be given on the basis that the first protocol is the IrSimple protocol and the first packet is the SNRM packet. The IrSimple protocol, as described above, is the protocol used in execution of infrared communication which was developed as an improvement of the IrDA protocol. When the receiving device 2 receives the SNRM packet transmitted thereto and the receiving device 2 transmits an after-described UA packet to the infrared communication apparatus 1, the receiving device 2 is found to be compatible with the IrSimple protocol.

The second transmitting unit 102 is a part that transmits a second packet to the receiving device 2. The second packet herein is a packet to inquire whether the receiving device 2 is compatible with a second protocol and, for example, the aforementioned XID one-slot packet (i.e., the Discovery-XID-Cmd packet) corresponds thereto. The second protocol is an infrared communication protocol using a single slot for performing a predetermined second communication procedure and, for example, the aforementioned IrDA protocol compatible with one slot (i.e., compatible with reception of only the XID one-slot packet) corresponds thereto. The description hereinafter will be given on the basis that the second protocol is the one-slot-compatible IrDA protocol and the second packet is the XID one-slot packet with the slot number 0. The XID one-slot packet contains address information of the host station or infrared communication apparatus 1. When the receiving device 2 receives the XID one-slot packet transmitted thereto and the receiving device 2 transmits an after-described Rsp packet to the infrared communication apparatus 1, the receiving device 2 is found to be compatible with the one-slot-compatible IrDA protocol.

The third transmitting unit 103 is a part that transmits a plurality of third packets to the receiving device 2 after the transmission of the SNRM packet by the first transmitting unit 101 and the transmission of the XID one-slot packet by the second transmitting unit 102 are executed at least once for a predetermined period of time. The plurality of third packets herein are packets to inquire whether the receiving device 2 is compatible with a third protocol and, for example, the aforementioned eight XID multi-slot packets with the slot numbers of 0 to 7 correspond thereto. The present embodiment will be described as to a case where the number of XID multi-slot packets is 8, but there are no particular restrictions on the number of XID multi-slot packets; for example, it may be 6 or 16. The infrared communication apparatus 1 is allowed to set the number of XID multi-slot packets. The third protocol is an infrared communication protocol using a plurality of slots for executing a predetermined third communication procedure and, for example, the aforementioned IrDA protocol compatible with multi-slots (i.e., compatible with reception of eight XID multi-slot packets only) corresponds thereto. The description hereinafter will be given on the basis that the third protocol is the multi-slot-compatible IrDA protocol. When the receiving device 2 receives the XID multi-slot packets transmitted thereto and the receiving device 2 transmits an Rsp multi packet to the infrared communication apparatus 1, the receiving device 2 is found to be compatible with the multi-slot-compatible IrDA protocol. In this case, the receiving device 2 selects one of the eight XID multi-slot packets received, arbitrarily (e.g., at random by a random number or the like) and transmits as a response, an Rsp multi packet corresponding to the selected XID multi-slot packet to the infrared communication apparatus 1. For this reason, the infrared communication apparatus 1 can discover the existence of receiving devices 2 as many as the number of XID multi-slot packets (i.e., eight in this case).

The receiving unit 104 is a part that receives a response packet from the receiving device 2 having received the SNRM packet, XID one-slot packet, and XID multi-slot packets. The response packet herein is a packet to indicate a protocol with which this receiving device 2 is compatible. Differences of the protocols with which the receiving device 2 is compatible, depending upon types of response packets, will be described later. The response packet received by the receiving unit 104 is transmitted via the communication control unit 111 to the determining unit 105.

The determining unit 105 is a part that determines the protocol with which the receiving device 2 is compatible, based on a type of the response packet received by the receiving unit 104. When the response packet received from the receiving device 2 is an Unnumbered Acknowledge (IrSimple) packet (hereinafter referred to as a UA packet), the receiving device 2 is found to be compatible with the IrSimple protocol. When the response packet received from the receiving device 2 is a Discovery-XID-Rsp (IrDA) packet (hereinafter referred to as an Rsp packet) with the least significant two bits of 00 in Discovery Flags, the receiving device 2 is found to be compatible with the one-slot-compatible IrDA protocol. When the response packet received from the receiving device 2 is a Discovery-XID-Rsp (IrDA) packet (hereinafter referred to as an Rsp multi packet) with the least significant two bits of 01, 10, or 11 in Discovery Flags, the receiving device 2 is found to be compatible with the multi-slot-compatible IrDA protocol. The information about the protocol with which the receiving device 2 is compatible, determined by the determining unit 105, is transmitted via the communication control unit 111 to the data transmitting unit 106.

The data transmitting unit 106 is a part that transmits data to the receiving device 2, based on the protocol indicated by the response packet received by the receiving unit 104. Namely, the data transmitting unit 106 transmits the data to the receiving device 2, based on the protocol with which the receiving device 2 is compatible, which was determined by the determining unit 105. The data transmitted to the receiving device 2 is, for example, image data taken by the imaging unit 107, phonebook data stored in the infrared communication apparatus 1, and so on.

The imaging unit 107 is a part that images a subject such as a person or a landscape and is, for example, a camera or the like installed in the surface of the infrared communication apparatus 1. Captured image data generated by imaging the subject by the imaging unit 107 is transmitted to the data storage unit 108.

The data storage unit 108 is a part that receives and stores the captured image data from the imaging unit 107. The captured image data stored in the data storage unit 108 is transmitted to the data transmitting unit 106 under control of the communication control unit 111.

The input unit 109 is a part that feeds a command of initiation of data communication between the infrared communication apparatus 1 and the receiving device 2, to the communication control unit 111 and is, for example, a push button or the like provided in the surface of the infrared communication apparatus 1.

The creating unit 110 is a part that creates a protocol used when the data transmitting unit 106 transmits data to the receiving device 2. The protocol created by the creating unit 110 is transmitted via the communication control unit 111 to the data transmitting unit 106.

The communication control unit 111 is a part that performs controls for initiating the data communication between the infrared communication apparatus 1 and the receiving device 2. The communication control unit 111 performs, for example, the following controls: it transmits the response packet received by the receiving unit 104, to the determining unit 105; it transmits information about the protocol determined by the determining unit 105, to the data transmitting unit 106; it transmits the captured image data stored in the data storage unit 108, to the data transmitting unit 106; it accepts the command of initiation of data communication fed from the input unit 109; it transmits the protocol created by the creating unit 110, to the data transmitting unit 106, and so on.

The receiving device 2 for performing data communication with the infrared communication apparatus 1 will be described below. The receiving device 2 is a device that receives data from the infrared communication apparatus 1, as described above. An example of the receiving device 2 is a personal computer, a television set, a printer, or the like with an infrared receiving unit.

The receiving device 2 is comprised of the following functional components: reception unit 201, terminal control unit 202, response unit 203, data memory unit 204, display unit 205, and printing unit 206. When the receiving device 2 is a printer, it is not provided with the display unit 205; when the receiving device 2 is a television set, it is not provided with the printing unit 206. For example, a printer is compatible with only the multi-slot-compatible IrDA protocol, and a television set is compatible with only the IrSimple protocol. A personal computer is compatible with the one-slot and multi-slot-compatible IrDA protocols, and the IrSimple protocol. The personal computer is provided with a command input unit (not shown) and when a user enters a command in this command input unit, the receiving device 2 can display image data or the like on the display unit 205 or make the printing unit 206 print the image data or the like.

The reception unit 201 is a part that receives the SNRM packet transmitted from the first transmitting unit 101, the XID one-slot packet transmitted from the second transmitting unit 102, and the plurality of XID multi-slot packets transmitted from the third transmitting unit 103. The reception unit 201 also receives data or the like transmitted from the data transmitting unit 106. These packets and data received by the reception unit 201 are transmitted to the terminal control unit 202.

The terminal control unit 202 is a part that performs controls for initiating data communication between the infrared communication apparatus 1 and the receiving device 2. Based on the aforementioned packet received by the reception unit 201, the terminal control unit 202 selects a response packet for responding to this packet and transmits this response packet to the response unit 203. The terminal control unit 202 also transmits the aforementioned data received by the reception unit 201, to the data memory unit 204.

The response unit 203 is a part that receives a response packet from the terminal control unit 202 and transmits this response packet to the receiving unit 104 of the infrared communication apparatus 1.

The data memory unit 204 is a part that receives and memorizes data from the terminal control unit 202. The data memorized in the data memory unit 204 is transmitted to the display unit 205 or to the printing unit 206.

The display unit 205 is a part that receives data from the data memory unit 204 and displays this data. The display unit 205 is, for example, a display monitor or the like.

The printing unit 206 is a part that receives data from the data memory unit 204 and prints this data as output.

Figure 2:
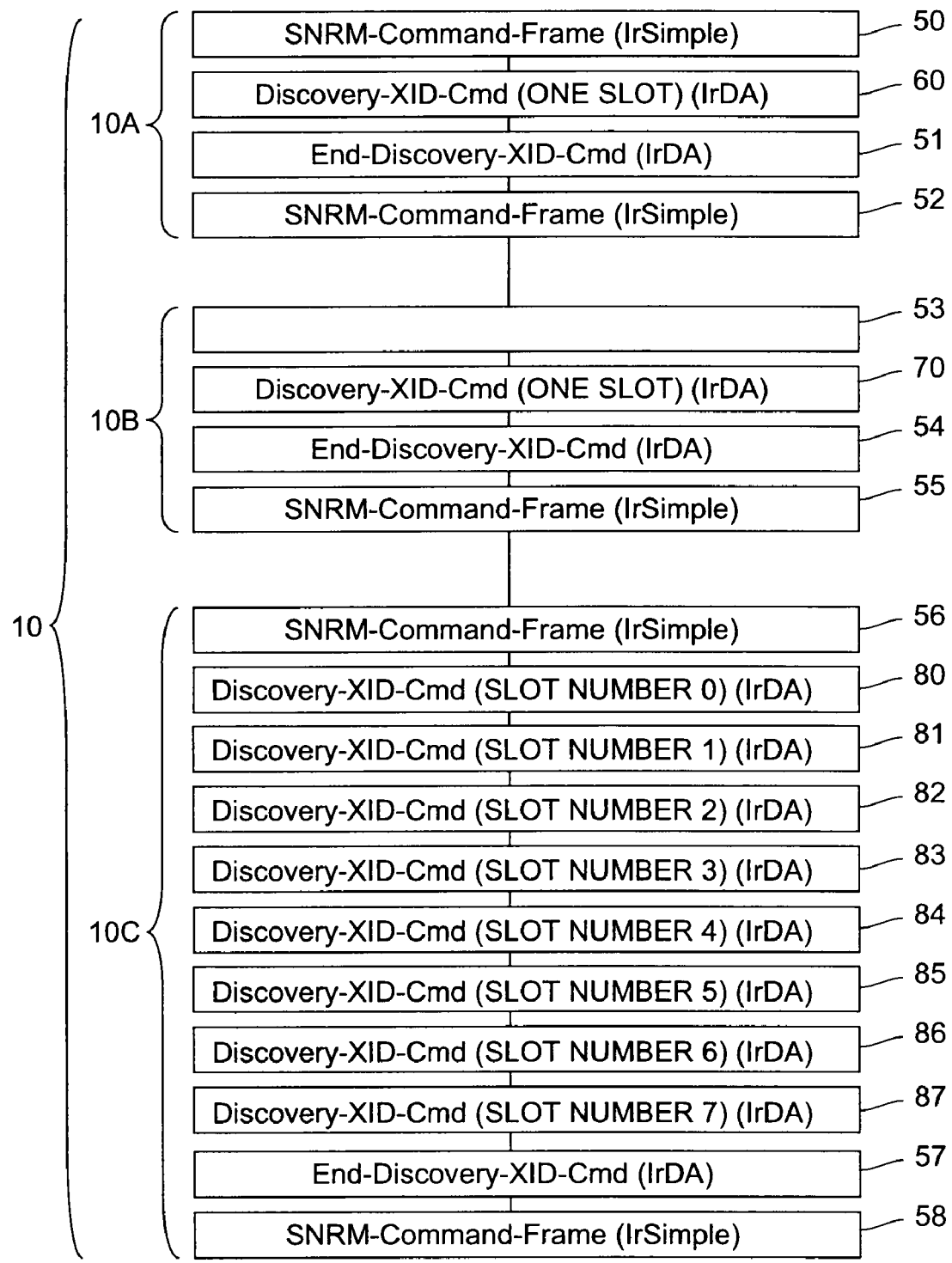
FIG. 2 is a configuration diagram of a discovery command.

A discovery command which is transmitted from the infrared communication apparatus 1 to the receiving device 2 will be described below. The discovery command is a command constructed with the aforementioned packets, which is transmitted by the transmitting unit 100. The discovery command allows the apparatus to discover a receiving device 2 for performing data communication with the infrared communication apparatus 1 and to specify the protocol and slot number with which the receiving device 2 is compatible. FIG. 2 is a configuration diagram of an example of the discovery command 10 for explaining a configuration of the discovery command. Packets are transmitted one by one in order from the uppermost packet in FIG. 2 to the receiving device 2.

The discovery command 10 is comprised of three command groups, command groups 10A, 10B, 10C, arranged in sequence. The command group 10A is comprised of SNRM packet 50, XID one-slot packet 60, End-Discovery-XID-Cmd (IrDA) packet (hereinafter referred to as an End packet) 51, and SNRM packet 52 arranged in sequence. The SNRM packets 50, 52 are packets transmitted by the first transmitting unit 101, the XID one-slot packet 60 is a packet transmitted by the second transmitting unit 102, and the End packet 51 is a packet transmitted by the second transmitting unit 102. The unit to perform the transmission of End packet 51 does not have to be limited to the second transmitting unit 102, but may be the first transmitting unit 101 or the third transmitting unit 103. The End packet 51 is a packet to indicate an end of a discovery process of XID one-slot packet 60.

The command group 10B has a configuration similar to the command group 10A. Namely, the command group 10B is comprised of SNRM packet 53, XID one-slot packet 70, End packet 54, and SNRM packet 55 arranged in sequence. After transmission of the command group 10A, this command group 10B is transmitted if a predetermined period of time described below has not elapsed yet (i.e., if no time-out occurs). Furthermore, after transmission of this command group 10B, another command group in a configuration similar to the command groups 10A, 10B is transmitted if the predetermined time has not elapsed yet. As a consequence, transmission of the SNRM packet, transmission of the XID one-slot packet, and transmission of the SNRM packet are repeatedly carried out before the lapse of the predetermined time. It is assumed herein that the after-described predetermined time has elapsed after transmission of the command group 10B. In this case, transmission of command group 10C is next carried out.

The command group 10C is comprised of SNRM packet 56, eight XID multi-slot packets 80-87, End packet 57, and SNRM packet 58 arranged in sequence. The eight XID multi-slot packets 80-87 herein are the XID multi-slot packets with the slot numbers of 0-7 and these eight XID multi-slot packets are arranged in sequence. The XID multi-slot packet 80 and the XID one-slot packet 60 using the same slot number 0 are packets with their respective least significant two bits different from each other in Discovery Flags. The SNRM packets 56, 58 are packets transmitted by the first transmitting unit 101, the eight XID multi-slot packets 80-87 are packets transmitted by the second transmitting unit 102, and the End packet 57 is a packet transmitted by the third transmitting unit 103.

Figure 3:
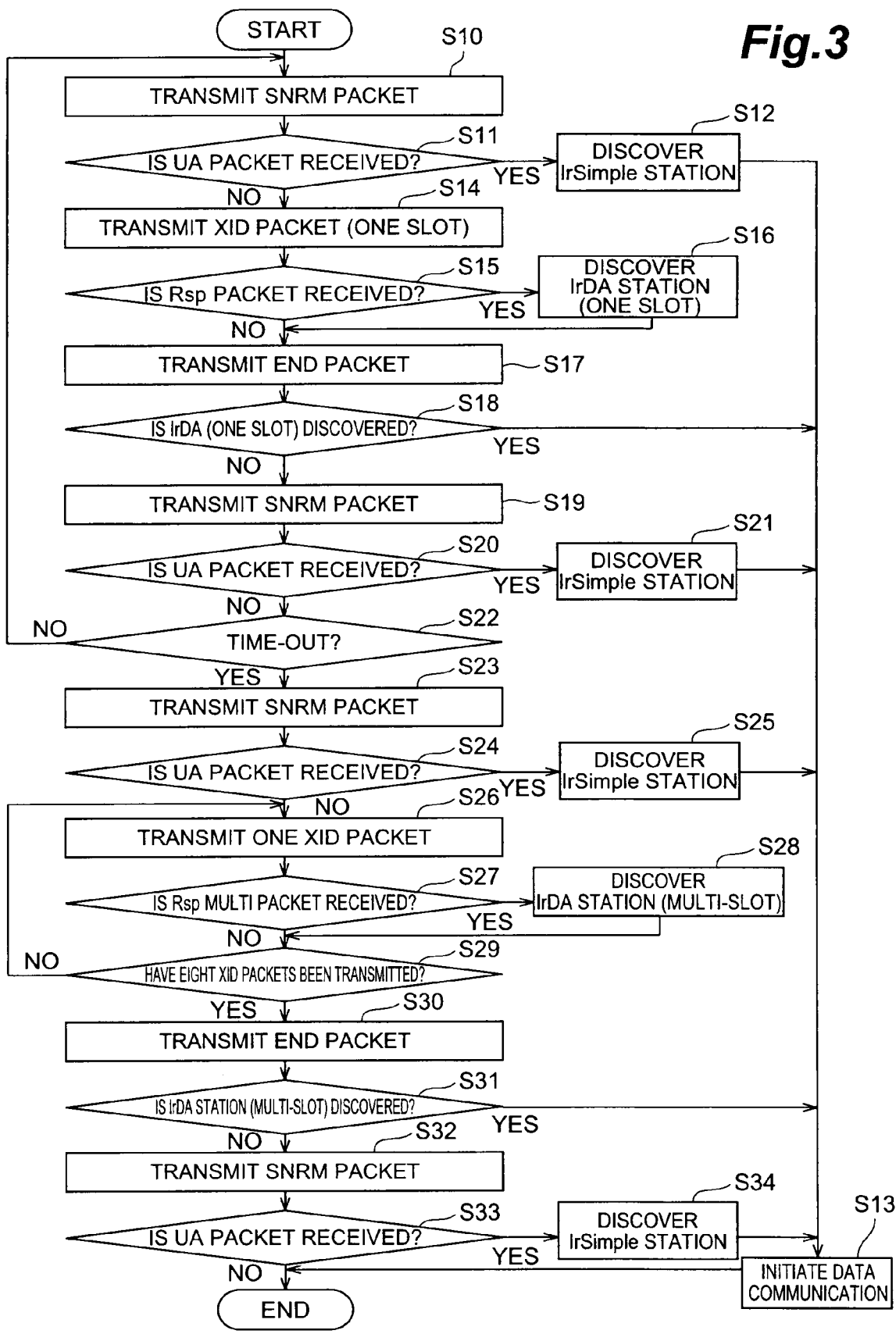
FIG. 3 is a sequence diagram showing an operation of the infrared communication apparatus.

The operation of the infrared communication apparatus 1 will be described below using the sequence diagram shown in FIG. 3. FIG. 3 is a sequence diagram showing the operation of the infrared communication apparatus 1 executed when transmission/reception of data is initiated between the infrared communication apparatus 1 and the receiving device 2.

First, the transmitting unit 100 of the infrared communication apparatus 1 transmits the SNRM packet 50 to the receiving device 2 (S10). The transmitting unit 100 monitors (or observes) infrared light for 50 milliseconds, after the transmission of SNRM packet 50. In subsequent operation, the transmitting unit 100 performs the monitoring in the same manner, after transmission of a packet. A retrial of monitoring may be allowed. During the period of this monitoring, the determining unit 105 determines whether the infrared communication apparatus 1 received a UA packet corresponding to this SNRM packet 50 from the receiving device 2 (S11). When the receiving device 2 receiving the SNRM packet 50 responds to this SNRM packet 50, the response unit 203 of the receiving device 2 transmits the UA packet to the infrared communication apparatus 1. Since this causes the infrared communication apparatus 1 to receive this UA packet, the infrared communication apparatus 1 recognizes that the receiving device 2 is compatible with the IrSimple protocol (or discovers an IrSimple station) (S12). Since the SNRM packet 50 also contains information necessary for the aforementioned connection process, the aforementioned connection process is completed at this point of time. This results in initiating the data communication (based on the IrSimple protocol) between the infrared communication apparatus 1 and the receiving device 2 (S13). More specifically, the infrared communication apparatus 1 transmits at least one UI (Unnumbered Information) packet containing data, to the receiving device 2 to implement the data communication. After completion of the data communication, the transmitting unit 100 of the infrared communication apparatus 1 transmits a Disconnect-Cmd packet to the receiving device 2 and the receiving device 2 receiving it sends a Disconnect-Rsp packet back to the infrared communication apparatus 1. This disconnects the connection and terminates the data communication.

On the other hand, when it is determined in S11 that the infrared communication apparatus 1 received no UA packet, the transmitting unit 100 of the infrared communication apparatus 1 transmits the XID one-slot packet 60 to the receiving device 2 (S14). Then the determining unit 105 determines whether the infrared communication apparatus 1 received an Rsp packet corresponding to this XID one-slot packet 60 from the receiving device 2 (S15). When the receiving device 2 receiving the XID one-slot packet 60 responds to this XID one-slot packet 60, the response unit 203 of the receiving device 2 transmits the Rsp packet to the infrared communication apparatus 1. Since this causes the infrared communication apparatus 1 to receive this Rsp packet, the infrared communication apparatus 1 recognizes that the receiving device 2 is compatible with the one-slot-compatible IrDA protocol (or discovers a one-slot-compatible IrDA station) (S16), and the processing proceeds to S17.

When it is determined in S15 that the infrared communication apparatus 1 did not receive this Rsp packet from the receiving device 2, the transmitting unit 100 of the infrared communication apparatus 1 transmits the End packet 51 to the receiving device 2 (S17). It is then determined whether the infrared communication apparatus 1 discovered a one-slot-compatible IrDA station (S18). When it is determined that the infrared communication apparatus 1 discovered the one-slot-compatible IrDA station, data communication based on the (one-slot-compatible) IrDA protocol is initiated between the infrared communication apparatus 1 and the receiving device 2 (S13). More specifically, an SNRM confirmation packet (or SNRM-Command-Frame packet) is transmitted from the infrared communication apparatus 1 to the receiving device 2. After the receiving device 2 receives this SNRM confirmation packet, it then sends an SNRM acknowledgement packet to the infrared communication apparatus 1. This results in establishing a connection between the infrared communication apparatus 1 and the receiving device 2. Then the infrared communication apparatus 1 transmits at least one I-Frame packet containing data, to the receiving device 2 to implement the data communication. After completion of the data communication, the transmitting unit 100 of the infrared communication apparatus 1 transmits an Unsequenced-Cmd packet to the receiving device 2 and the receiving device 2 receiving it returns an Unsequenced-Rsp packet to the infrared communication apparatus 1. This disconnects the connection and terminates the data communication. On the other hand, when it is determined in S18 that the infrared communication apparatus 1 discovered no one-slot-compatible IrDA station, the infrared communication apparatus 1 transmits the SNRM packet 52 to the receiving device 2 (S19). Then the determining unit 105 determines whether the infrared communication apparatus 1 received a UA packet corresponding to this SNRM packet 52 from the receiving device 2 (S20). When the receiving device 2 receiving the SNRM packet 52 responds to this SNRM packet 52, the response unit 203 of the receiving device 2 transmits a UA packet to the infrared communication apparatus 1. Since this causes the infrared communication apparatus 1 to receive this UA packet, the infrared communication apparatus 1 recognizes that the receiving device 2 is compatible with the IrSimple protocol (or discovers an IrSimple station) (S21). This results in initiating the data communication (based on the IrSimple protocol) between the infrared communication apparatus 1 and the receiving device 2 (S13).

On the other hand, when it is determined in S20 that the infrared communication apparatus 1 received no UA packet from the receiving device 2, it is determined whether a time-out occurs at this point (S22). Namely, it is determined whether the predetermined period of time has elapsed, as a result of execution of the transmission of the SNRM packet 50 in S11, the transmission of the XID one-slot packet 60 in S15, and the transmission of the SNRM packet 52 in S19. If it is determined that no time-out has occurred yet even after execution of the transmissions of these three packets, the flow returns to the aforementioned step S10 to repeat transmissions of these three packets (in the example shown in FIG. 2, a time-out occurs after the transmissions of these three packets are carried out twice in total).

When it is determined in S22 that a time-out occurred, the infrared communication apparatus 1 transmits the SNRM packet 56 to the receiving device 2 (S23). Then the determining unit 105 determines whether the infrared communication apparatus 1 received a UA packet corresponding to this SNRM packet 56 from the receiving device 2 (S24). When the receiving device 2 receiving the SNRM packet 56 responds to this SNRM packet 56, the response unit 203 of the receiving device 2 transmits the UA packet to the infrared communication apparatus 1. Since this causes the infrared communication apparatus 1 to receive this UA packet, the infrared communication apparatus 1 recognizes that the receiving device 2 is compatible with the IrSimple protocol (or discovers an IrSimple station) (S25). This results in initiating the data communication (based on the IrSimple protocol) between the infrared communication apparatus 1 and the receiving device 2 (S13).

On the other hand, when it is determined in S24 that the infrared communication apparatus 1 received no UA packet from the receiving device 2, the transmitting unit 100 of the infrared communication apparatus 1 transmits the XID multi-slot packet 80 with the slot number 0 to the receiving device 2 (S26). Then the determining unit 105 determines whether the infrared communication apparatus 1 received an Rsp multi packet corresponding to this XID multi-slot packet 80 from the receiving device 2 (S27). When the receiving device 2 receiving the XID multi-slot packet 80 responds to this XID multi-slot packet 80, the response unit 203 of the receiving device 2 transmits an Rsp multi packet to the infrared communication apparatus 1. This Rsp multi packet contains address information of the correspondent station or receiving device 2. Since this causes the infrared communication apparatus 1 to receive this Rsp multi packet, the infrared communication apparatus 1 recognizes that the receiving device 2 is compatible with the multi-slot-compatible IrDA protocol (or discovers a multi-slot-compatible IrDA station) (S28), and then the processing proceeds to S29.

When it is determined in S27 that the infrared communication apparatus 1 did not receive this Rsp multi packet from the receiving device 2, the determining unit 105 determines whether the transmitting unit 100 of the infrared communication apparatus 1 has already transmitted a predetermined number of XID multi-slot packets (eight XID multi-slot packets 80-87 herein) (S29). When it is not determined that the eight XID multi-slot packets have been transmitted, the processing returns to the aforementioned step S26 and the transmitting unit 100 of the infrared communication apparatus 1 transmits another XID multi-slot packet to the receiving device 2 (S26). The slot number of the next-transmitted XID multi-slot packet is increased by 1 to become 1 (i.e., the XID multi-slot packet 81) and the slot number of the next-transmitted XID multi-slot packet thereafter is further increased by 1 to become 2 (i.e., the XID multi-slot packet 82). In this manner, the XID multi-slot packet with the slot number incremented by one is successively transmitted until the eight XID multi-slot packets have been transmitted.

When it is determined in S29 that the eight XID multi-slot packets have already been transmitted, the transmitting unit 100 of the infrared communication apparatus 1 transmits an End packet 57 to the receiving device 2 (S30). It is then determined whether the infrared communication apparatus 1 discovered a multi-slot-compatible IrDA station (S31). When it is determined that the infrared communication apparatus 1 discovered a multi-slot-compatible IrDA station, data communication based on the (multi-slot-compatible) IrDA protocol is initiated between the infrared communication apparatus 1 and the receiving device 2 (S13). The details of the process to initiate the data communication is the same as in the case of the aforementioned one-slot-compatible IrDA protocol.

On the other hand, when it is determined in S31 that the infrared communication apparatus 1 discovered no multi-slot-compatible IrDA station, the infrared communication apparatus 1 transmits the SNRM packet 58 to the receiving device 2 (S32). It is then determined whether the infrared communication apparatus 1 received a UA packet corresponding to this SNRM packet 58 from the receiving device 2 (S33). When the receiving device 2 receiving the SNRM packet 58 responds to this SNRM packet 58, the response unit 203 of the receiving device 2 transmits the UA packet to the infrared communication apparatus 1. Since this causes the infrared communication apparatus 1 to receive this UA packet, the infrared communication apparatus 1 recognizes that the receiving device 2 is compatible with the IrSimple protocol (or discovers an IrSimple station) (S34). This results in initiating the data communication (based on the IrSimple protocol) between the infrared communication apparatus 1 and the receiving device 2 (S13).

On the other hand, when it is determined in S33 that the infrared communication apparatus 1 received no UA packet, it is judged that the infrared communication apparatus 1 failed to discover any one of the IrSimple station, the one-slot-compatible IrSimple station, and the multi-slot-compatible IrDA station, and therefore the sequential processing is terminated without initiation of the data communication between the infrared communication apparatus 1 and the receiving device 2.

Figure 4:
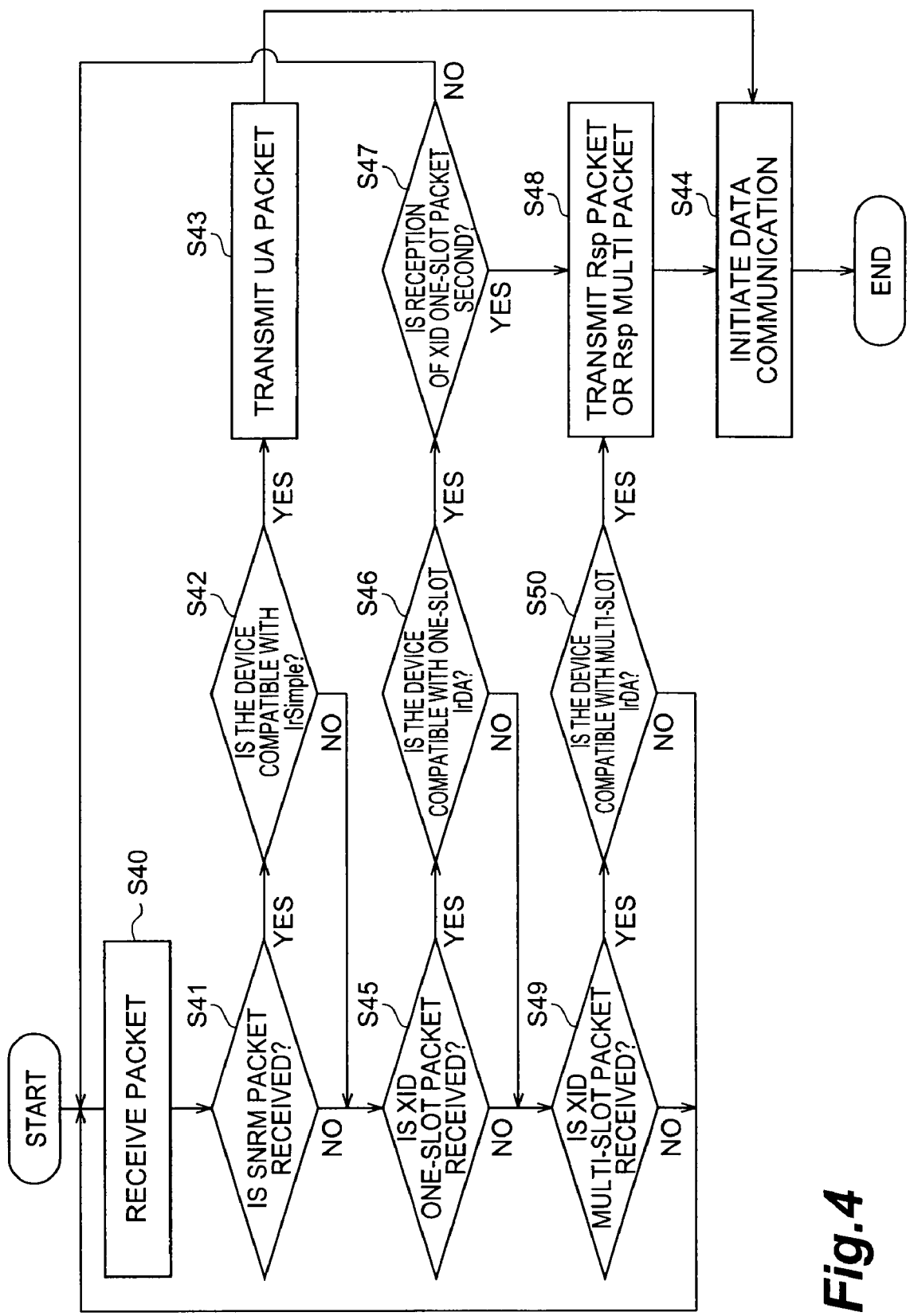
FIG. 4 is a sequence diagram showing an operation of the receiving device.
Figure 5:
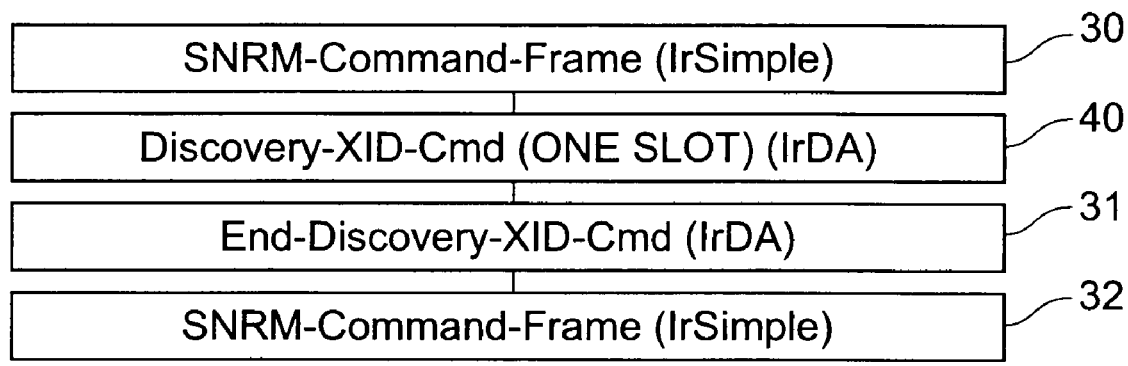
FIG. 5 is a configuration diagram of a conventional command.

Subsequently, the operation of the receiving device 2 will be described using the sequence diagram shown in FIG. 4. FIG. 4 is a sequence diagram showing the operation of the receiving device 2 executed when transmission/reception of data is initiated between the infrared communication apparatus 1 and the receiving device 2.

First, the receiving device 2 receives a packet (S40). It is then determined whether the receiving device 2 received the SNRM packet (S41). When it is determined that the receiving device 2 received this SNRM packet, it is then determined whether the receiving device 2 is compatible with the IrSimple protocol (S42). When it is determined that the receiving device 2 is compatible with the IrSimple protocol, the response unit 203 of the receiving device 2 transmits a UA packet to the infrared communication apparatus 1 (S43). Since this causes the infrared communication apparatus 1 to receive this UA packet, the infrared communication apparatus 1 recognizes that the receiving device 2 is compatible with the IrSimple protocol (or discovers an IrSimple station). This results in initiating the data communication (based on the IrSimple protocol) between the infrared communication apparatus 1 and the receiving device 2 (S44). When it is determined in S42 that the receiving device 2 is not compatible with the IrSimple protocol, the processing proceeds to below-described step S45.

On the other hand, when it is determined in S41 that the receiving device 2 did not receive this SNRM packet, it is then determined whether the receiving device 2 received the XID one-slot packet (S45). When it is determined that the receiving device 2 received the XID one-slot packet, it is then determined whether the receiving device 2 is compatible with the one-slot IrDA protocol (S46). When it is determined that the receiving device 2 is compatible with the one-slot IrDA protocol, it is then determined whether the reception of the XID one-slot packet by the receiving device 2 is the second reception thereof (S47). When it is determined that the reception of the XID one-slot packet by the receiving device 2 is the second reception thereof, the response unit 203 of the receiving device 2 transmits an Rsp packet to the infrared communication apparatus 1 (S48). This causes the infrared communication apparatus 1 to receive this Rsp packet and this results in initiating the data communication (based on the one-slot-compatible IrDA protocol) between the infrared communication apparatus 1 and the receiving device 2 (S44). On the other hand, when it is determined that the reception of the XID one-slot packet by the receiving device 2 is not the second reception, the processing returns to the aforementioned step S40 to await reception of the next packet (S40), and the determination process is performed again. This results in ignoring the XID one-slot packet first received by the receiving device 2. When it is determined in S46 that the receiving device 2 is not compatible with the one-slot IrDA protocol, the processing proceeds to below-described step S49.

When it is determined in S45 that the receiving device 2 did not receive the XID one-slot packet, it is determined whether the receiving device 2 received the XID multi-slot packet (S49). When it is determined that the receiving device 2 did not receive the XID multi-slot packet, the processing returns to the aforementioned step S40 to await reception of the next packet (S40) and the determination process is performed again. On the other hand, when it is determined that the receiving device 2 received the XID multi-slot packet, it is then determined whether the receiving device 2 is compatible with the multi-slot IrDA protocol (S50). When it is determined that the receiving device 2 is not compatible with the multi-slot IrDA protocol, the processing returns to the aforementioned step S40 to await reception of the next packet (S40) and the determination process is performed again. On the other hand, when it is determined that the receiving device 2 is compatible with the multi-slot IrDA protocol, the response unit 203 of the receiving device 2 transmits an Rsp multi packet to the infrared communication apparatus 1 (S48). This causes the infrared communication apparatus 1 to receive this Rsp multi packet and this results in initiating the data communication (based on the multi-slot-compatible IrDA protocol) between the infrared communication apparatus 1 and the receiving device 2 (S44).

The action and effect of the present embodiment will be described below. First, the transmitting unit 100 performs the transmission of the first packet (SNRM packet 50) (S10), and the transmission of the second packet (XID one-slot packet 60) (S14) at least once. After this (S10-S22), the transmitting unit 100 transmits the plurality of third packets (eight XID multi-slot packets 80-87) to the receiving device 2 (S26-S29). Then the receiving unit 104 receives the response packet (UA packet, Rsp packet, or Rsp multi packet) indicating the protocol with which the receiving device 2 is compatible, which was transmitted from the receiving device 2 having received the first packet, the second packet, and the plurality of third packets. Based on the protocol indicated by the response packet received by the receiving unit 104, the data transmitting unit 106 transmits data to the receiving device 2. Since in this configuration the first packet is transmitted to the receiving device 2, even if the receiving device 2 is compatible with only the first protocol, e.g., the IrSimple protocol, the data transmission can be performed based on the protocol indicated by the response packet (UA packet) sent from the receiving device 2 in response to the first packet, i.e., based on the IrSimple protocol. Since the second packet is transmitted to the receiving device 2, even if the receiving device 2 is compatible with only the second protocol, e.g., the single-slot or one-slot-compatible IrDA protocol, the data transmission can be performed based on the protocol indicated by the response packet (Rsp packet) sent from the receiving device 2 in response to the second packet, i.e., based on the one-slot-compatible IrDA protocol. Furthermore, since the plurality of third packets are transmitted to the receiving device 2, even if the receiving device 2 is compatible with only the third protocol, e.g., the IrDA protocol compatible with a plurality of slots or compatible with multi-slots, the data transmission can be performed based on the protocol indicated by the response packet (Rsp multi packet) sent from the receiving device 2 in response to the third packets, i.e., based on the multi-slot-compatible IrDA protocol. As a result, the data communication between infrared communication apparatus 1 and receiving device 2 can be implemented regardless of the protocol and slot number with which the receiving device 2 is compatible (S13).

Now, let us describe a case where the receiving device 2 is compatible with all of the IrSimple protocol being the first protocol, the one-slot-compatible IrDA protocol being the second protocol, and the multi-slot-compatible IrDA protocol being the third protocol. In this case, where the receiving device 2 becomes ready for reception of a packet from the initial or intermediate part of the command groups 10A and 10B shown in FIG. 2 and where reception is started from this packet part, data communication based on the IrSimple protocol enabling faster communication is selected and the data communication based on this protocol is carried out (because the receiving device 2 returns a UA packet). When the receiving device 2 is compatible with these three protocols and when the receiving device 2 becomes ready for reception from the plurality of third packets in the command group 10C in FIG. 2, the data communication based on the (multi-slot-compatible) IrDA protocol is selected (because the receiving device 2 returns an Rsp multi packet).

When it is desired to perform the data communication based on the IrSimple protocol allowing faster communication, the infrared communication apparatus 1 and the receiving device 2 can be arranged to perform either of two processing procedures described below. Namely, the first processing procedure is as follows. First, the transmitting unit 100 of the infrared communication apparatus 1 transmits the command group 10C shown in FIG. 2, twice or more times, subsequent to the command groups 10A and 10B shown in FIG. 2. Receiving them, the receiving device 2 (which is a one-slot-compatible IrDA station and multi-slot-compatible IrDA station) is arranged not to send an Rsp multi packet upon the first packet reception but to send an Rsp multi packet upon the second packet reception.

Alternatively, the second processing procedure is as follows. First, the transmitting unit 100 of the infrared communication apparatus 1 transmits the command group 10C shown in FIG. 2, twice or more times, subsequent to the command groups 10A and 10B shown in FIG. 2, in the same manner as in the first processing procedure. When the infrared communication apparatus 1 receives the second Rsp multi packet from the receiving device 2, it first recognizes that the receiving device 2 is compatible with the multi-slot-compatible IrDA station, and then initiates the subsequent data communication process. Namely, the infrared communication apparatus 1 is arranged to store only the fact of reception upon the reception of the first Rsp multi packet and not to initiate the data communication process.

When either of these two processing procedures is performed in the infrared communication apparatus 1 and the receiving device 2, the communication using the IrSimple protocol of the first protocol can be performed instead of the communication using the (multi-slot-compatible) IrDA protocol of the third protocol even if the receiving device 2 becomes ready for reception immediately before reception of the plurality of third packets.

After the transmitting unit 100 transmits all of the third packets, it again transmits the first packet to the receiving device 2 (S32). Even if the receiving device 2 is not ready to receive the first packet transmitted from the transmitting unit 100, the first packet is transmitted again in this configuration and thus the receiving device 2 can receive the first packet more definitely.

The invention claimed is:

1. An infrared communication apparatus for performing infrared communication with a receiving device for receiving data, said infrared communication apparatus comprising:
    a transmitter that performs transmission of a SNRM packet to inquire whether the receiving device is compatible with an IrSimple protocol for carrying out a predetermined first communication procedure, and transmission of a XID one-slot packet to inquire whether the receiving device is compatible with a one-slot compatible IrDA protocol for carrying out a predetermined second communication procedure, to the receiving device at least once, and thereafter transmitting a plurality of XID multi-slot packets to inquire whether the receiving device is compatible with a multi-slot compatible IrDA protocol for carrying out a predetermined third communication procedure, to the receiving device;
    a receiver that receives a response packet to indicate a protocol with which the receiving device is compatible, from the receiving device having received the SNRM packet, the XID one-slot packet, and the plurality of XID multi-slot packets from the transmitter; and
    a data transmitter that transmits the data to the receiving device, based on the protocol indicated by the response packet received by the receiver.

2. The infrared communication apparatus according to claim 1, wherein the transmitter again transmits the SNRM packet to the receiving device, after completion of transmission of all the plurality of XID multi-slot packets.

3. An infrared communication method for performing infrared communication with a receiving device for receiving data,
    said infrared communication method comprising:
    performing transmission of a SNRM packet to inquire whether the receiving device is compatible with an IrSimple protocol for carrying out a predetermined first communication procedure, and transmission of a XID one-slot packet to inquire whether the receiving device is compatible with a one-slot compatible IrDA protocol for carrying out a predetermined second communication procedure, to the receiving device at least once, and thereafter transmitting a plurality of XID multi-slot packets to inquire whether the receiving device is compatible with a multi-slot compatible IrDA protocol for carrying out a predetermined third communication procedure, to the receiving device;
    receiving a response packet to indicate a protocol with which the receiving device is compatible, from the receiving device having received the SNRM packet, the XID one-slot packet, and the plurality of XID multi-slot packets in the performing transmission; and
    transmitting the data to the receiving device, based on the protocol indicated by the response packet received in the receiving.

4. The infrared communication apparatus according to claim 1, wherein the transmitter transmits the plurality of XID multi-slot packets to inquire whether the receiving device is compatible with a multi-slot compatible IrDA after the transmission of the SNRM packet and the XID one-slot packet are executed at least once for a predetermined period of time.

* * * * *